Feb. 3, 1925.                                                          1,524,851
F. F. WOLF
APPARATUS FOR WASHING AND DRYING CONTAINERS
Original Filed Jan. 26, 1922    3 Sheets-Sheet 3
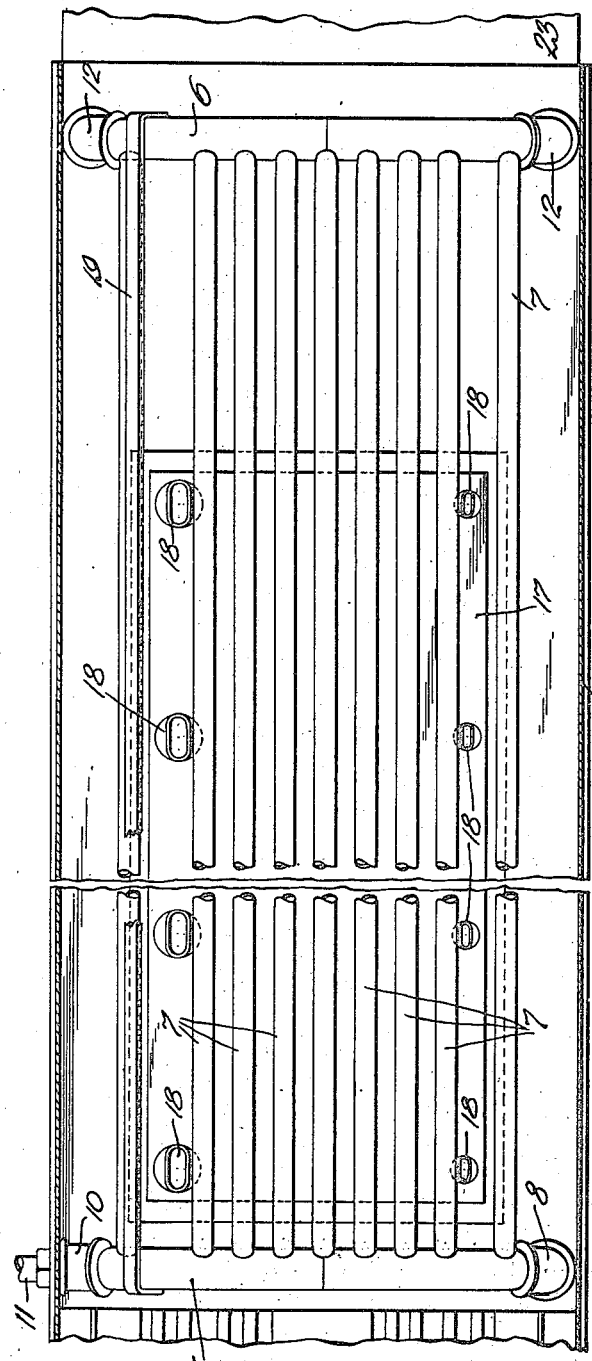
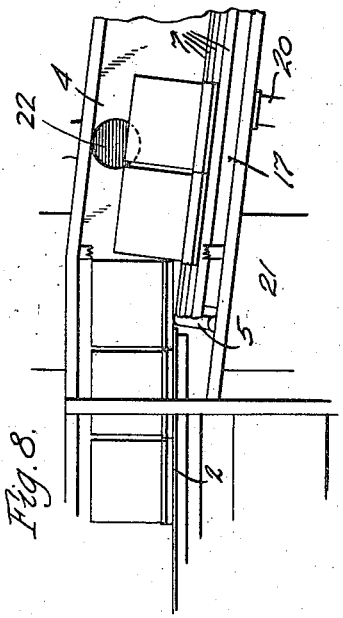
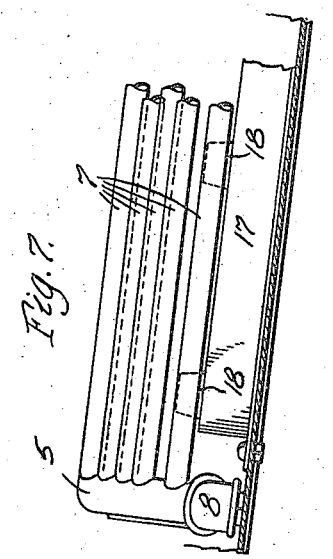
INVENTOR.
Frank F. Wolf,
by Parker & Prochnow.
ATTORNEYS.

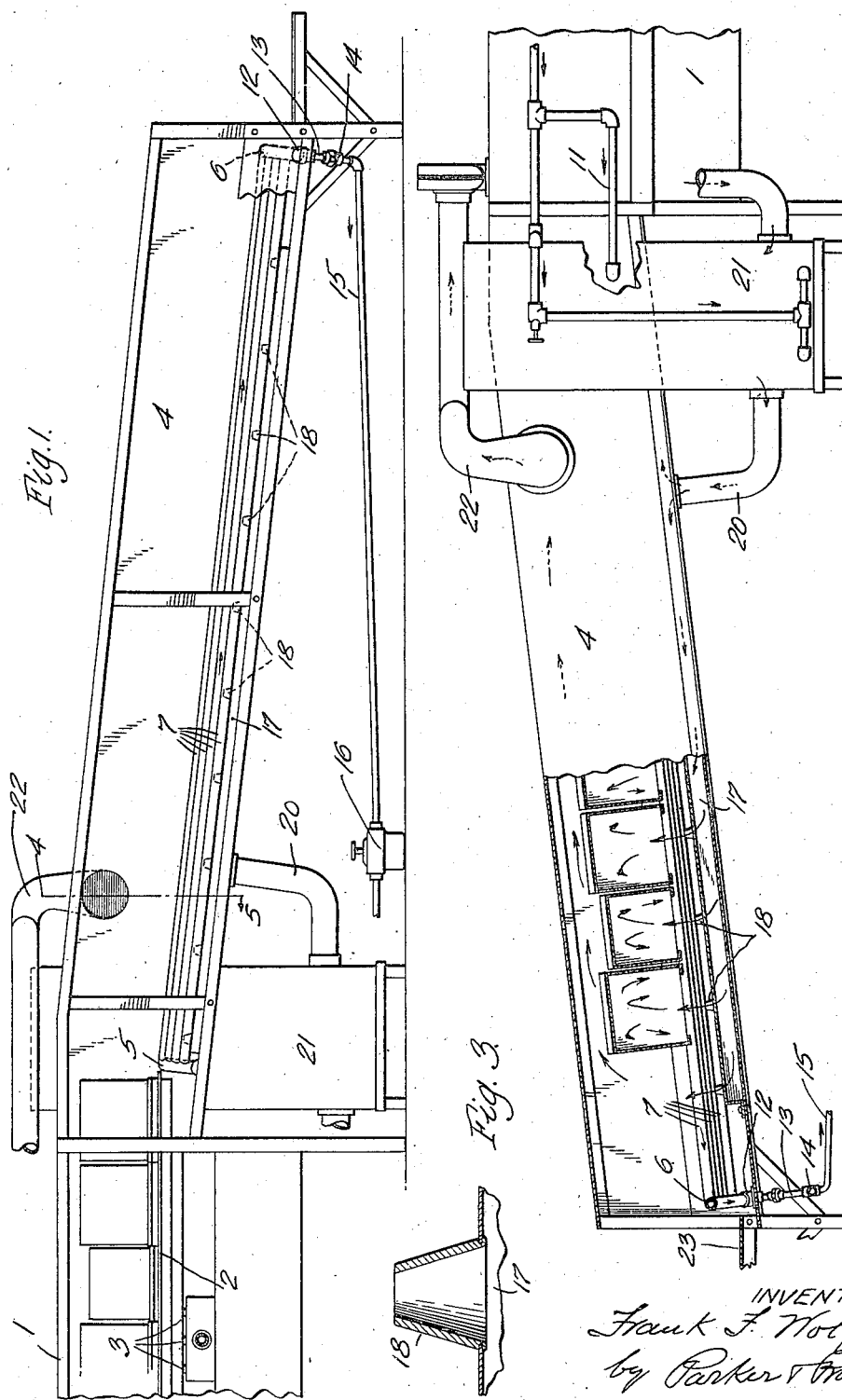

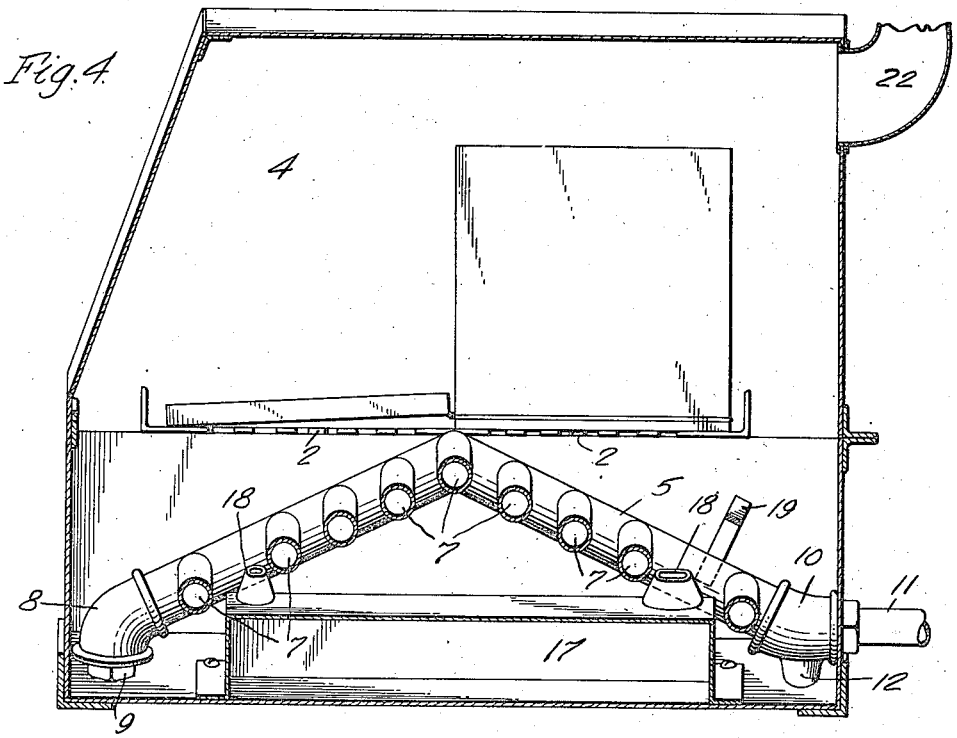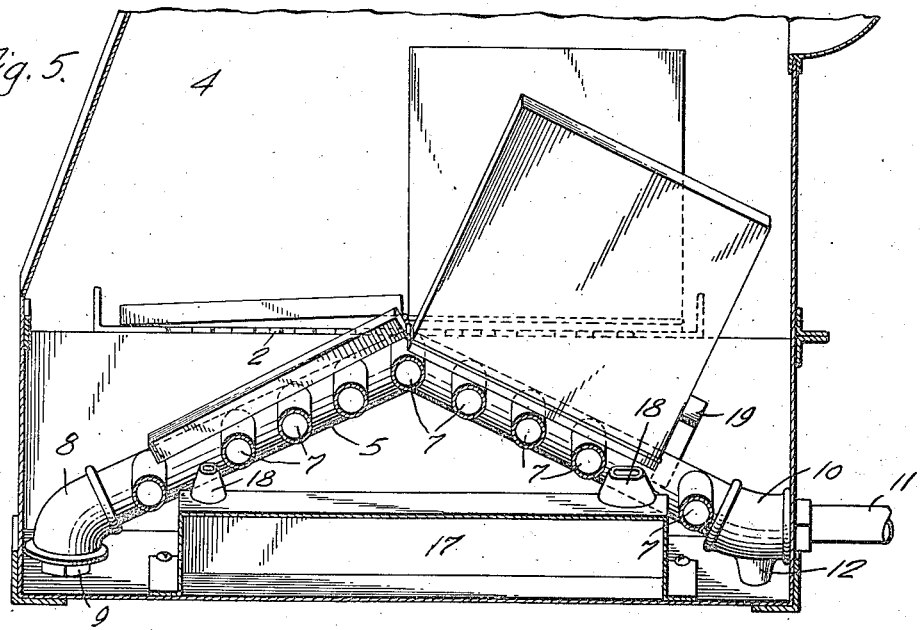

Patented Feb. 3, 1925.

1,524,851

UNITED STATES PATENT OFFICE.

FRANK F. WOLF, OF BUFFALO, NEW YORK, ASSIGNOR TO RICE & ADAMS CORPORATION, OF BUFFALO, NEW YORK.

APPARATUS FOR WASHING AND DRYING CONTAINERS.

Application filed January 26, 1922, Serial No. 531,928. Renewed December 6, 1924.

*To all whom it may concern:*

Be it known that I, FRANK F. WOLF, a citizen of the United States, residing at Buffalo, in the county of Erie and State of New York, have invented a new and useful Improvement in Apparatus for Washing and Drying Containers, of which the following is a specification.

This invention relates to improvements in washing machines for containers and the like and particularly to that type of tin containers known as "biscuit tins."

This type of container usually comprises a rectangular tin box, the edges of the side walls of which at the open end are inturned or have formed thereon inwardly extending flanges for stiffening purposes, and a lid hinged or otherwise secured to one of the side walls.

The ordinary type of container washing machine, when used for cleaning this type of biscuit tin, I have found does not sufficiently dry out all of the moisture from the tin without subjecting the tin to a drying action for a long period of time which necessitates a long machine and travel of the tin, or reduces the capacity of the machine. This is principally due to the fact that the washing and rinsing water finds lodgment in the corners and crevices of the tin and on the bottom and sides of the tin above the stiffening flange, which water is not readily dried out by the present form of machine and, furthermore, because the tins are not sufficiently heated.

The object of this invention is to provide a drying mechanism for machines for washing this type of tin which will dislodge the particles or drops of water adhering to the interior surfaces and in the crevices of the tin and also will insure a thorough heating of the walls of the tin, a large supply of heated air being projected against the surfaces thereof so as to thoroughly dry the tin both inside and out and thereby reduce the drying period and consequent length of the machine, and travel of the tins to a minimum.

For the purpose of disclosing the invention one embodiment thereof is illustrated in the accompanying drawings wherein:

Fig. 1 is a side elevation of an apparatus embodying my invention, one side of the drying chamber being removed to show the interior arrangement and only a portion of the washing apparatus being shown, Fig. 2 is a side elevation looking in the opposite direction, a portion of one side being broken away, Fig. 3 is a detail section of the hot air nozzle, Figs. 4 and 5 are sectional views taken on the line 4—5 of Fig. 1 and showing the tin in different positions, Fig. 6 is a plan view of the radiator track, Fig. 7 is a detail section showing the relative positions of the radiator track and hot air chest; and Fig. 8 is a detail view showing the manner of jolting the tins as they leave the washing apparatus.

The washing and rinsing mechanism of the washing apparatus 1 may be of any desired form and is usually provided with a mechanism 2 for conveying the tins above washing and rinsing nozzles with a step by step movement. This conveyor and the washing and rinsing nozzles are preferably mounted within a frame and so that the conveyor moves the tins in an inverted position with the cover open and lying substantially at right angles to the sides of the tin. Beneath the conveyor track on which the tins are adapted to slide during their step by step movement, washing nozzles and rinsing nozzles 3 are arranged in succession so that the tin first passes over a series of nozzles which inject into the tin and against the inner surface of the top thereof, a suitable washing solution. After passing above the washing nozzles, the tin passes over the rinsing nozzles 3 which inject clear hot rinsing water against the interior surfaces of the tin for rinsing the washing fluid off, and frequently steam, either saturated or superheated, is likewise projected against these surfaces. In so far as this invention is concerned, the washing or cleaning and sterilizing portion of the machine can be of any known or suitable construction.

At the delivery end of the washing and rinsing section of the apparatus there is provided an elongated housing 4 having the sides, top and bottom thereof preferably formed of sheet metal, which housing forms a drying chamber through which the tins are adapted to pass. This drying chamber is preferably inclined downwardly from the end of the washing and rinsing section and arranged within the chamber is a radiator track also having a downward inclination and on which the tins are adapted to travel through the length of the heating chamber. This track preferably comprises a pair of inverted V-shaped end pipes 5 and 6 which are adapted to be arranged transversely in the drying chamber and, extending longitudinally between these end pipes, is a series of longitudinallly extending track pipes 7, the whole forming a complete unit in itself on which the tin is adapted to travel toward the delivery end of the heating and drying chamber. This unit preferably rests on the bottom of the chamber and the transversely extending pipes, at the receiving end of the drying chamber, are provided at one end with an elbow 8 closed by a suitable plug 9 and at the other end with an elbow 10 by which a steam connection may be made with a supply pipe 11 leading from a suitable steam supply. This elbow 10 on its under side preferably has a leg or lug 12 formed integrally therewith to support the end of the radiator and maintain the same in a level position, although, if desired, the connection through the side wall of the heating chamber for the steam pipe may be relied on for the support on this side. By this arrangement the apparatus may be readily inserted in the chamber and the steam connection made from either side.

The opposite end pipe 6 is connected by means of elbows 12, by a pair of return branch pipes 13 and a union connection 14 with the return steam pipe 15 leading to a steam trap 16 and back to the steam supply boiler or to an exhaust opening. The radiator track as a whole provides a single unit radiator and due to the inverted V formation of the track and its inclination, as the tins move off of the conveyor track 2 of the washing and rinsing section of the apparatus, the bodies and covers of the same are jarred or jolted to dislodge drops of water which may be retained on the sides and particularly on the bottoms of the tin and on the under surface of the cover by capillary attraction or by surface tension. As the tins slide or are pushed off from the conveyor track of the washing and rinsing portion of the machine, the front end of the tin is held up for an appreciable period by its frictional engagement with the tin immediately preceding it, so that the tin will project quite a distance beyond the end of the track before it tends to tilt whereby, when its front end finally drops, it will receive a decided jolt or jar. Furthermore, as the radiator track is inclined downwardly from the center towards the sides, the outer edges or sides are considerably below the delivery track of the washing and rinsing section, and as the tins pass off the washing machine a decided drop is taken by their outer edges which will additionally jar the tin and break loose the drops of water adhering to the walls of the tins. Furthermore, due to this tilting action of the tins, the surfaces of the cover and the bottom of the tin will be inclined and the drops of water adhering to them will be more easily dislodged as they will tend to flow toward the outer edges. The water is then drained off or broken up and will be more readily absorbed by the heated air of the drying chamber.

Arranged beneath the heating track is a hot air supply chest 17 which is provided, near its outer edges and in spaced relation to one another, with a double series of hot air nozzles 18. This chest preferably consists of a rectangular, flat, sheet metal container extending from the receiving end of the drying chamber to a point near the delivery end, or, if desired, the pan may be made longer and extend clear to the end of the drying chamber. The nozzles 18 are preferably cone-shaped, having their bases inserted in openings formed in the top of the chest and flanged over to secure them in position. At the delivery end the nozzles are preferably oval in shape, the greatest length being in the direction of travel of the tin and their ends projected between the outer longitudinal pipes of the radiator, the pipes being additionally spaced for this purpose. These nozzles are in such spaced relation that as the tins are fed forward on the radiator tracks 7 with a step by step movement they momentarily stop with the body and cover respectively above a nozzle so that heated air which is discharged by the nozzles will be delivered against the inner surfaces of the tin and cover, whereby the entire interior surface of the cover and the interior walls of the body of the tin are flooded with hot air to thoroughly dry out any moisture which may remain in the tin. Furthermore, as the tin and its cover slide along on the radiator tracks, they are in intimate contact with these tracks which are highly heated by steam passing therethrough, and the walls of the tin are thoroughly heated by conduction both inside and out to additionally insure a sufficient heating of the tin to properly dry the same. Also the radiator additionally heats the drying chamber so that the tin is subjected to the influence of a large volume of highly heated air and thoroughly dried in a short space of time. By the inverted V-shaped formation of the track, in addition to tilting the tin and its cover, the tin is guided during its travel through the drying chamber and held against lateral displacement. To additionally guide the tin, however, I provide a guide rail 19 against which the side of the tin bears.

For supplying heated air to the hot air chest, a suitable conduit 20 is preferably provided which is connected through the bottom of the drying chamber with the chest and at its opposite end is connected with an air heater 21 of any suitable type, and for removing the moisture ladened air at the top of the drying chamber an exhaust conduit 22 is connected to a suitable exhaust fan.

It will be seen from the above, that the tins as they pass through the drying chamber are subjected not only to a blast of hot air which is projected against the interior surface thereof but have the walls thereof thoroughly heated by conduction, and the radiator track not only tends to heat the walls by conduction but also tends to heat the entire drying chamber, so that the tins pass through a hot chamber and all of the moisture remaining thereon, after they have passed out of the rinsing portion of the machine, is thoroughly dried, so that the tins are delivered on the delivery rack 23 at the end of the heating chamber in a thoroughly dried and sterilized condition. Due to the heating of the tins and the large volume of heated air to which they are subjected, they are dried in an extremely short period of time, whereby the length of travel of the tins and consequent length of the machine may be reduced to the minimum.

I claim as my invention:

1. In an apparatus of the character described, the combination with an apparatus for washing articles, of means for drying the same as they are delivered from said washing apparatus comprising a radiator forming a track on which the articles travel after being washed, and means for delivering air against the surface of said articles.

2. In an apparatus for washing and drying containers having hinged covers, the combination with an apparatus for washing said containers, of means for drying the same comprising an inverted V-shaped track on which the articles travel after being washed and are supported in an inverted position with the body arranged on one side of the apex of said V and the cover arranged on the opposite side of the apex of said V, and means for delivering heated air against the interior surfaces of said containers.

3. In an apparatus of the character described, the combination with an apparatus for washing articles, of means for drying the same as they are delivered from said washing apparatus comprising a radiator, through which heating fluid is arranged to pass, for heating the articles and forming a track on which the articles travel.

4. In an apparatus of the character described, the combination with an apparatus for washing articles, of means for drying the same as they are delivered from said washing apparatus comprising a V-shaped radiator forming a track on which the articles travel after being washed and having the outer edges thereof below the delivery end of the washing machine to jar the articles as they are delivered on said track, and means for delivering air against the surfaces of said articles.

5. In an apparatus of the character described, the combination with an apparatus for washing articles, of means for drying the same as they are delivered from said washing apparatus, comprising a drying chamber through which the articles are adapted to pass after being washed, means for heating the walls of said articles by conduction as they pass through said chamber, and means for delivering heated air to the surfaces of said articles.

6. In an apparatus of the character described, the combination with an apparatus for washing articles, of means for drying the same as they are delivered from said washing apparatus, comprising a drying chamber through which the articles are adapted to pass after being washed, a radiator arranged within said drying chamber for heating the interior thereof, and means for delivering heated air against the surfaces of said articles.

7. In an apparatus of the character described, the combination with an apparatus for washing articles, of means for drying the same as they are delivered from said washing apparatus comprising a drying chamber through which the articles are adapted to pass after being washed, a radiator forming a track on which the articles travel through said drying chamber for heating the chamber and the walls of the articles, and means for delivering air against the surfaces of said articles.

8. In an apparatus of the character described, the combination with an apparatus for washing the containers, of means for drying the same as they are delivered from said washing apparatus, comprising a drying chamber through which the containers are adapted to pass after being washed, a track on which said articles are adapted to travel through said drying chamber having the rails thereof heated, and means for delivering air against the interior surfaces of said containers.

9. In an apparatus for washing and drying containers having hinged covers, the combination with apparatus for washing said containers, of means for drying the same comprising a drying chamber through which the containers are arranged to pass after being washed, an inverted V-shaped track for supporting the articles in an inverted position as they travel through said chamber and with the body arranged on one side of the apex of said V and the cover arranged on the opposite side of the apex of said V, and means for delivering heated air against the interior surfaces of said containers.

10. In an apparatus of the character described, the combination with an apparatus for washing containers, of means for drying the same as they are delivered from said washing apparatus comprising a drying chamber through which the articles are adapted to pass after being washed, and means for jolting the articles in their passage through said drying chamber for dislodging the water adhering to the surfaces thereof.

11. In an apparatus of the character described, the combination with an apparatus for washing containers, of means for drying the same as they are delivered from said washing apparatus comprising a drying chamber through which the articles pass after leaving the washing apparatus, means for jolting the articles in their passage through said drying chamber to dislodge the water adhering to the surfaces thereof, and means for directing heated air against said surfaces.

12. In an apparatus of the character described, the combination with an apparatus for washing containers, of means for drying the same as they are delivered from said washing apparatus comprising a drying chamber through which the articles pass after being washed, means for jolting the articles in their passage through said chamber for dislodging the water adhering to the walls of said articles, and means for heating said articles.

13. In an apparatus of the character described, the combination with an apparatus for washing containers, of means for drying the same as they are delivered from said washing apparatus comprising a drying chamber through which the containers are adapted to pass after being washed, a track on which said containers are adapted to travel through said drying chamber having a portion thereof at a lower level than the delivery track of the washing apparatus whereby the containers will drop as they leave the washing apparatus and dislodge the water adhering to the walls of said container.

14. In an apparatus of the character described, the combination with apparatus for washing containers, of means for drying said containers comprising a drying chamber through which the containers are adapted to pass after being washed, means for jolting said containers in their travel and for tilting the horizontal surfaces of said containers toward the vertical to dislodge the water adhering to the surfaces of said containers.

15. In an apparatus for washing and drying containers having hinged covers, the combination with apparatus for washing the containers, of means for drying said containers comprising a drying chamber through which the containers are adapted to pass after being washed, an inverted V-shaped radiator track supporting the container and cover in an inverted position and on which said containers are adapted to travel through said chamber and a plurality of spaced apart air blast nozzles arranged beneath said radiator track for delivering heated air through said track and against the interior surfaces of said containers.

16. In an apparatus of the character described, the combination with apparatus for washing containers, of means for drying said containers as they are delivered from said washing apparatus comprising a drying chamber through which the containers are adapted to pass after being washed, and means for tilting said containers to incline the horizontal walls thereof toward the vertical to cause the water adhering thereto to run off.

17. In an apparatus of the character described, the combination with an apparatus for washing containers having lids, of means for drying said containers as they are delivered from said washing apparatus comprising a drying chamber through which the containers are adapted to pass after being washed, and means for tilting said containers forwardly and tilting the body and lids of the containers transversely as they are delivered from the washing apparatus to jar the containers and dislodge particles of water adhering to the surfaces thereof.

18. In an apparatus of the character described, the combination of an apparatus for washing containers, of means for drying the same as they are delivered from said washing apparatus comprising a drying chamber through which the articles are arranged to pass after being washed, an inclined radiator track comprising a plurality of longitudinally extending radiator pipes mounted within said chamber and on which the articles to be dried travel in inverted position, and a plurality of hot air nozzles arranged beneath said pipes for delivering blasts of hot air against the interior surfaces of said containers as they pass through said drying chamber.

19. An apparatus for drying containers while in motion, comprising a track on which the containers are supported and adapted to travel, said track being formed by longitudinal pipes through which a heating medium is adapted to flow for heating the containers.

20. An apparatus for drying containers while in motion, comprising a track on which the containers are supported and adapted to travel, said track being formed by longitudinal pipes through which a heating medium is adapted to flow for heating the containers, and means for delivering air against the containers while travelling along said track.

21. An apparatus for drying containers having covers, comprising an inverted V-shaped radiator forming a track along which the containers are adapted to travel in inverted position with the body and cover of the container disposed at opposite sides of the apex of said V, said radiator having longitudinal pipes through which a heating medium is adapted to flow for heating the containers.

FRANK F. WOLF.